Aug. 9, 1932.    W. S. WERNER    1,870,937
ELECTRICAL RECTIFYING AND STABILIZING APPARATUS
Filed May 9, 1930    2 Sheets-Sheet 1
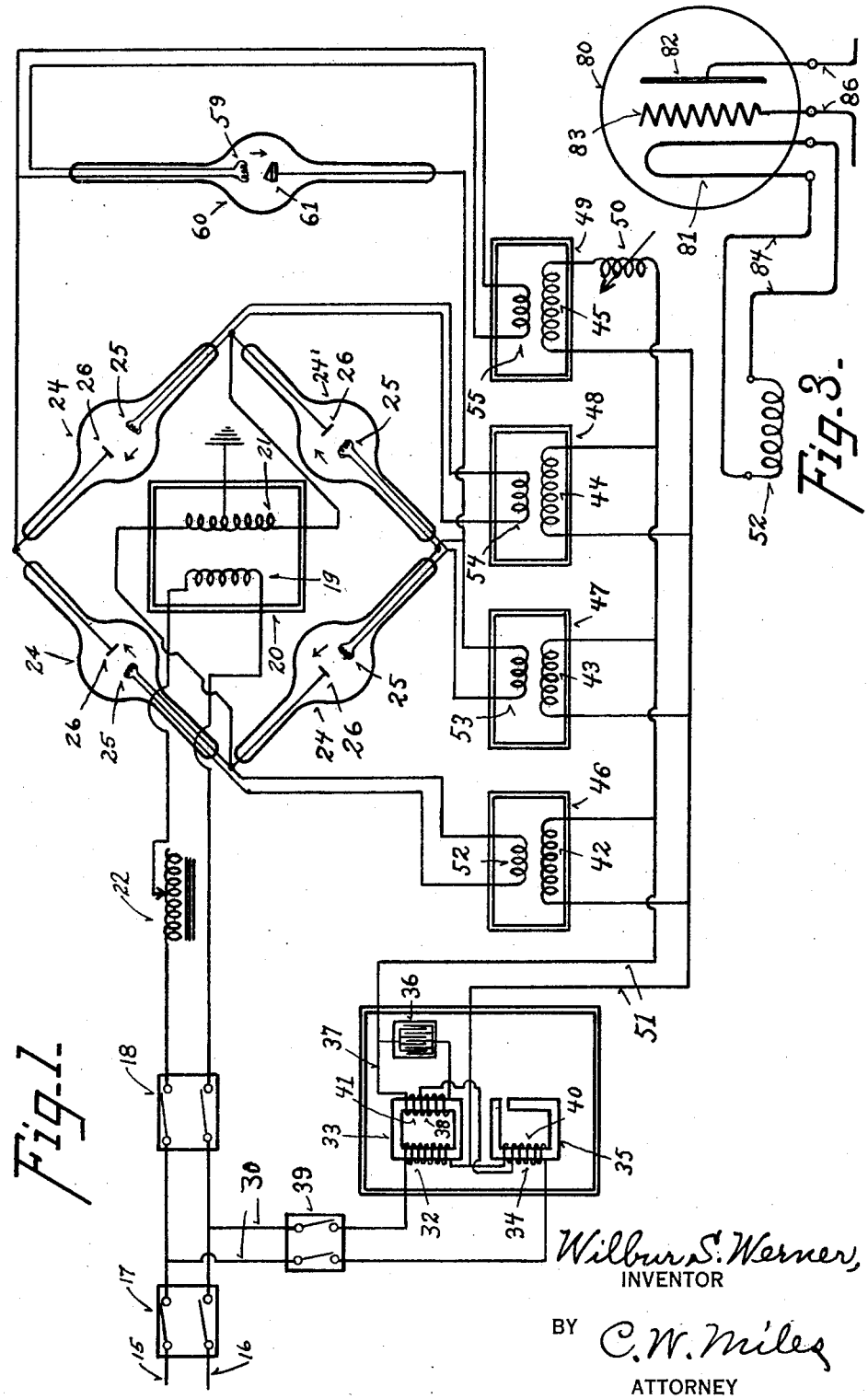

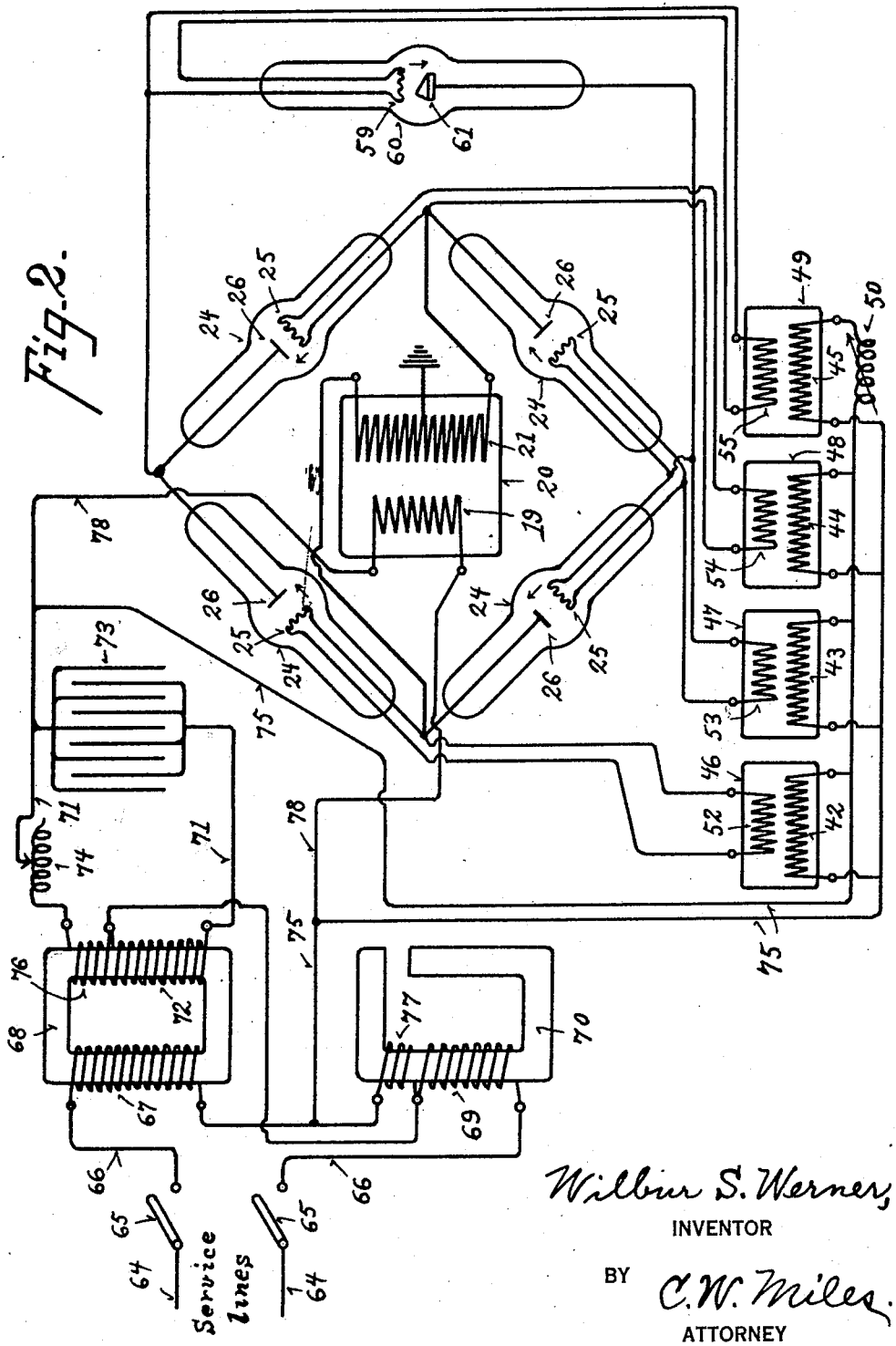

Patented Aug. 9, 1932

1,870,937

UNITED STATES PATENT OFFICE

WILBUR S. WERNER, OF FORT MITCHELL, KENTUCKY, ASSIGNOR TO THE KELLEY-KOETT MANUFACTURING COMPANY, OF COVINGTON, KENTUCKY, A CORPORATION OF OHIO

ELECTRICAL RECTIFYING AND STABILIZING APPARATUS

Application filed May 9, 1930. Serial No. 451,061.

My invention relates to improvements in electrical rectifying apparatus. One of its objects is to provide improved means to rectify and stabilize electrical current from an alternating current source. Another object is to provide improved means to step-up, rectify and stabilize current from an alternating current source. Another object is to provide from an alternating current source a rectified current, which has impressed thereon a stabilizing influence tending to prevent excessive uncontrolled increases and excessive drops in potential. My invention also comprises certain details of form and arrangement and combination of components, all of which will be fully set forth in the description of the accompanying drawings, in which:

Fig. 1 is a diagrammatic view of an electrical rectifying and stabilizing apparatus embodying my improvements.

Fig. 2 is a diagrammatic view illustrating a modification.

Fig. 3, shows a modification of Fig. 1.

Various current rectifying means has been heretofore employed for X-ray apparatus and for other electrical purposes, such as electrolytic and mechanical rectification for instance, all of which have been open to the objection that the electrical impulses of the rectified current followed closely the electrical impulses of the energizing current, and hence when applied to attain a useful result, were uncontrollable and liable at intervals to exceed in potential or energy range that of the apparatus to which they were applied, and at other intervals were liable to fall below a useful potential or energy range of the apparatus to which they were applied. Employing my improved apparatus the peaks of pulsations of the rectified current are stabilized to avoid potential excesses, while pulsations which would, due to momentary lack of energy in the exciting circuit, under previous normal conditions fall below a desired or useful potential, are stabilized or stepped-up automatically to a potential range adapted to register satisfactorily upon the apparatus to which they are applied. Hence my improved apparatus is adapted to be employed in connection with X-ray apparatus to control and stabilize the potential of the Coolidge filament, and to control and stabilize the high tension current passed through the X-ray tube. It is also adapted to be employed to advantage in controlling and stabilizing the current employed in sending and receiving radio or wireless signals. It is also adapted to control and stabilize the potential in talking movie-pictures.

The accompanying drawings illustrate modifications of my improved apparatus, in Fig. 1 of which I have illustrated high tension rectifying and stabilizing apparatus adapted to energize X-ray tubes in which 15 and 16 represent alternating current service or energizing lines, provided with a switch 17. One branch of the energizing current leads to a switch 18 and thence to the primary winding 19 of a step-up transformer 20 of which 21 is the secondary winding. An adjustable choke coil, or if preferred, an adjustable resistance 22 is preferably included in the circuit with the primary winding 19. One or more rectifying tubes or rectifying valves 24 which are indicated diagrammatically in Fig. 1, and may be any one of several known thermal rectifying tubes, having for instance a filament terminal 25 and a plate terminal 26. A sufficient battery or number of these rectifying tubes are employed to pass the requisite amount of current for the purpose or use required of them. As illustrated the secondary winding 21 is provided with a central tap 27 which is grounded. If desired, two separate secondary windings could be employed in place of the winding 21.

As illustrated the two tubes 24 above the transformer 20 are connected in parallel to opposite ends of the secondary winding 21, and the two tubes 24 below the transformer 20 are connected in parallel to opposite ends of the secondary winding 21, said two tubes at the top of the transformer 20 being connected in circuit with the two tubes at the bottom of the transformer 20, so that current flow in one direction is directed through one set of tubes and current flow in the opposite direction is directed through another set of tubes, to thereby utilize both phases of the alternating current.

The filaments 25 of the respective tubes 24 each require a flow of low tension current to heat said filaments, and it is desirable that such heating currents be carefully regulated or stabilized as to potential. In order to stabilize the potential of the filament heating currents I provide a branch 30 of the energizing circuit in which are included a switch 39, a primary winding 32 on a closed core of magnetic material 33, and a primary winding 34 on an open core of magnetic material 35. A secondary winding 38 on the closed core 33 and a condenser 36 are included in a secondary circuit 37. A winding 40 on the open core 35, a winding 41 on the closed core 36, the primary windings 42, 43, 44, and 45 of the respective filament or insulating step-down transformers 46, 47, 48 and 49, and an adjustably choke coil or equivalent current regulating member 50 are included in a tertiary circuit 51. Secondary windings 52, 53, 54, and 55 of the transformers 46, 47, 48, and 49 are connected at opposite ends respectively to opposite ends of the respective filaments 25 of the respective tubes 24. I have also illustrated another filament transformer 56 having a primary winding 57, which is also included in the tertiary circuit 51. The secondary 58 of the transformer 56 serves to energize or heat the filament 59 of an X-ray tube 60, which is also provided with a target or terminal 61. The X-ray tube is connected in parallel with the rectifying tubes 24, and serves as an output or current consuming member to make use of the out-put of the transformer 20 and rectifier tubes 24.

In the modification Fig. 2 the arrangement of the tubes 24, the high tension transformer 20, and the transformers 46, 47, 48, and 49, the variable control 50, and the current consuming tube 60 are the same as heretofore described for Fig. 1. In Fig. 1 the voltage control is applied to the transformers 46, 47, 48, and 49 and the filament circuits only while as shown in Fig. 2 voltage control or stabilization is applied to the circuits of transformer 20 as well as to the transformers of the filament circuits.

As shown in Fig. 2, the primary source of energy or service lines 64 are provided with a switch 65, and thence through a primary circuit 66 in which are included a primary winding 67 on a closed magnetic core 68 and a primary winding 69 on an open magnetic core 70. The primary windings 67 and 69 correspond to the primary windings 32 and 34 of Fig. 1, and the magnetic cores 68 and 70 correspond to the magnetic cores 33 and 35 of Fig. 1. A secondary circuit 71 includes therein a secondary winding 72 on the closed magnetic core 68 a condenser 73, and preferably a circuit regulating member 74. The members 72, 73, and 74 of Fig. 2 correspond to members 38, 36 and 50 of Fig. 1. A tertiary circuit includes therein a secondary winding 76 on the closed core 68, and a winding 77 on the open core 70 and corresponds to the tertiary circuit 51 of Fig. 1. The tertiary circuit 75 serves to energize the transformer primaries 42, 43, 44, and 45, and also through a branch circuit 78, the primary 19 of the high tension transformer 20. In Fig. 1, I have shown the secondary winding 41 in parallel with the winding 38, and also the winding 40 in parallel with the winding 34. These windings 38 and 41 may, if desired, be separate windings, and the windings 38 and 40 may also be separate windings. The same is true as to the windings 72 and 76, and windings 69 and 77 of Fig. 2.

In Fig. 3 I have shown a radio sending or receiving tube 80 provided with a filament 81, a plate 82, and a grid 83. The filament 81 is shown included in a filament circuit 84 energized by a secondary winding 52 for instance such as shown in Fig. 1 and which circuit 84 is stabilized and controlled as to its voltage by means of windings upon a closed core 33 and on an open core 35, substantially as shown in Fig. 1, while the plate and grid are included in a radio sending or radio receiving circuit 86, of the usual type. Figs. 1 and 3 also illustrate the application of my improvements to stabilizing the current employed for the purpose of recording or releasing signals in talky moving pictures.

By stabilizing the potential of the filaments of the rectifier I am able to also control and stabilize the rectified high tension current out-put, and thereby attain superior results through use of the stabilized out-put current in the X-ray tube. The use of a stabilized filament current in the X-ray tube serves to further improve the quality of the result attained in the X-ray tube.

My invention is capable of considerable modification within the scope of the claims without departing from the spirit of my invention.

What I claim is:

1. Current rectifying and stabilizing apparatus comprising a tube having a filament and a plate, a closed magnetic core, an open magnetic core, a circuit in which said filament and plate are included, a filament heating primary circuit in which are included a primary winding on said closed core and a primary winding on said open core, and a secondary filament heating circuit in which are included a secondary winding on said closed core a condenser and said filament.

2. Current rectifying and stabilizing apparatus comprising a tube having a filament and a plate, a closed magnetic core, an open magnetic core, a circuit in which said filament and plate are included, a filament heating primary circuit in which are inclined a primary winding on said closed core and a primary winding on said open core, and a secondary winding in which are included a secondary winding on said closed core, a condenser, and a stabilizing winding on said open core.

3. Current rectifying and stabilizing apparatus comprising a plurality of rectifying tubes connected in series each having a filament and a plate, a circuit in which said filaments and plates are included in series, a closed magnetic core, an open magnetic core, a filament heating primary circuit in which are included a primary winding on said closed core, a primary winding on said open core, a secondary circuit in which are included a secondary winding on said closed core, a condenser, and the primaries of separate tertiary filament heating circuit transformers, and tertiary filament heating transformer secondary circuits, in which said filaments are separately included, the closed and open magnetic cores and windings serving to effect uniform heating of the filaments in the rectifying tube whereby the operation of the rectifying tubes is maintained constant independently of fluctuations in energizing supply service and variation in load.

4. Current rectifying and stabilizing apparatus comprising a plurality of rectifying tubes connected in series each having a filament and a plate, a circuit in which said filaments and plates are included in series, a closed magnetic core, an open magnetic core, a filament heating primary circuit in which are included a primary winding on said closed core, a primary winding on said open core, a secondary circuit in which are included a secondary winding on said closed core, a condenser and the primary of a separate filament heating circuit transformer, and a filament heating transformer secondary circuit in which said filaments are included, the closed and open magnetic cores and windings serving to effect uniform heating of the filaments in the rectifying tube whereby the operation of the rectifying tubes is maintained constant independently of fluctuations in energizing supply service and variation in load.

In testimony whereof I have affixed my signature.

WILBUR S. WERNER.